United States Patent [19]

Zaun

[11] Patent Number: 5,277,265

[45] Date of Patent: Jan. 11, 1994

[54] TOW VALVE AND INTERLOCK FOR A VEHICLE

[75] Inventor: Richard D. Zaun, West Des Moines, Iowa

[73] Assignee: Deere & Company, Moline, Ill.

[21] Appl. No.: 39,534

[22] Filed: Mar. 29, 1993

Related U.S. Application Data

[63] Continuation of Ser. No. 903,423, Jun. 24, 1992, abandoned.

[51] Int. Cl.⁵ .............................................. B62D 5/08
[52] U.S. Cl. .................... 180/132; 180/141; 280/445
[58] Field of Search ............ 180/141, 132, 79; 280/445, 446.1, 442, 432; 172/282

[56] References Cited

U.S. PATENT DOCUMENTS

| | | | |
|---|---|---|---|
| 2,930,631 | 3/1960 | Voorhess, Sr. | 280/445 |
| 2,943,867 | 7/1960 | Hartel | 280/442 |
| 3,214,188 | 10/1965 | Alfieri | 280/446.1 X |
| 3,581,838 | 6/1971 | Rhodes | 180/79 |
| 4,557,342 | 12/1985 | Drutchas | 180/132 |
| 4,655,667 | 4/1987 | Plumb et al. | 180/141 X |
| 4,779,418 | 10/1988 | Artzberger | 180/132 X |

OTHER PUBLICATIONS

John Deere Brochure "Convenient Crop Care", p. 6.

Melroe Spra-Coupe Model 230 Operator's Manual, pp. 1, 2, 7 and 37 dated Apr. 1989 (Rev. Dec. 1989).

*Primary Examiner*—Margaret A. Focarino
*Assistant Examiner*—Carla Mattix

[57] ABSTRACT

A bypass and switch arrangement is connected to the conventional steering system on a towable vehicle. A rotary bypass valve includes two ports connected between the two hydraulic lines leading from the steering control valve to the steering cylinder or motor. The bypass valve has a normal operating position which blocks flow between the lines so that normal steering operation is provided. When the vehicle is connected for towing, the bypass valve is rotated to an open towing position to permit free flow of fluid between the ports and lines so that fluid may move freely to and from the steering motor or cylinder. If a steering cylinder is used, a third port on the valve is connected to the oil cooler on the vehicle and opens the lines to reservoir through the cooler to accommodate the deficient or excess flow from or to the cylinder which results from the difference in effective area on opposite sides of the ram. A switch connected between the switched power supply and an electric shut-off valve on the vehicle engine injector pump is responsive to movement of the valve for disabling the engine when the valve is in the towing position. Before the engine can be restarted after towing, the valve must first be moved back to the operating position wherein normal steering and pump operation is enabled.

12 Claims, 2 Drawing Sheets

TOW VALVE AND INTERLOCK FOR A VEHICLE

This application is a continuation of application Ser. No. 07/903,423, filed June 24, 1992 now abandoned.

BACKGROUND OF THE INVENTION

1) Field of the Invention

The present invention relates generally to agricultural implements such as self-propelled sprayers, and more specifically to such a vehicle which is towable for transport between field locations.

2) Related Art

Self-propelled sprayers of the type exemplified by the commercially available John Deere Model 6000 Hi-Cycle often include a tow bar arrangement so that the sprayer may be connected to a chemical supply vehicle or pickup truck for transport from location to location. Sprayers usually include a hydraulic steering mechanism such as a steering motor or a steering cylinder. Such a mechanism can adversely affect sprayer trailing in the towed configuration if steering fluid pressure is not relieved. Lateral movement of the tow bar during connection of the sprayer to the towing vehicle is also greatly hampered by fluid pressure in the steering lines. Some sprayers utilize a bypass valve having a towing position which allows flow of fluid from one side to the other of the steering motor or cylinder during towing and tow bar connection. However, it is possible with such a system to inadvertently leave the valve in the towing position after towing and not realize that steering is disabled until after the engine is started and the drive is engaged. Also, on sprayers with steering cylinders, there are unequal volumes of oil moving on opposite sides of the ram because of the smaller effective area on the rod end side, and the bypass may not adequately relieve steering cylinder pressure because of the differential in fluid flow.

BRIEF SUMMARY OF THE INVENTION

It is therefore an object of the present invention to provide an improved steering arrangement for a vehicle such as a self-propelled sprayer which overcomes the aforementioned problems. It is another object to provide such an arrangement which is simple and reliable in operation and which may be used with either a hydraulic steering motor or a hydraulic steering cylinder to effectively relieve hydraulic pressure during transport and tow bar connection.

It is a further object of the invention to provide an improved steering arrangement for a vehicle such as a towable self-propelled sprayer wherein the arrangement has a selectible towing mode to improve towing characteristics. It is a further object to provide such an arrangement which prevents self-propelled operation of the vehicle when the towing mode is selected. It is still another object to provide such an arrangement which is usable with either a steering motor or a steering cylinder.

A bypass and switch arrangement is connected to the conventional steering system on a towable vehicle. A rotary bypass valve includes two ports connected between the two hydraulic lines leading from the steering control to the steering cylinder or motor. The valve has a normal operating position which blocks flow between the lines so that normal steering control is provided from the steering wheel. When the vehicle is connected for towing, the valve is rotated to an open bypass or towing position to permit free flow of fluid between the ports and lines so that fluid may move freely to and from the steering motor or cylinder, and steering control from the steering wheel is interrupted.

If a steering cylinder or other steering mechanism with unequal fluid flow in and out is used, a third port on the valve is connected to the oil cooler on the vehicle and opens the lines to reservoir to accommodate the deficient or excess flow from or to the mechanism. The vehicle towing characteristics are improved by preventing substantial pressure buildup on either side of the steering mechanism during transport. Tow bar connection to the towing vehicle is also facilitated.

A switch connected between the battery and the injection pump shut-off valve on the vehicle engine is responsive to movement of the rotary valve for disabling the engine when the valve is in the towing position. Before the engine can be started after towing, the valve must first be moved back to the operating position wherein normal injection pump operation and steering control through the steering wheel is enabled.

These and other objects, features and advantages of the present invention will become apparent to one skilled in the art upon reading the following detailed description in view of the drawings.

DETAILED DESCRIPTION OF THE DRAWINGS

Figure 1:
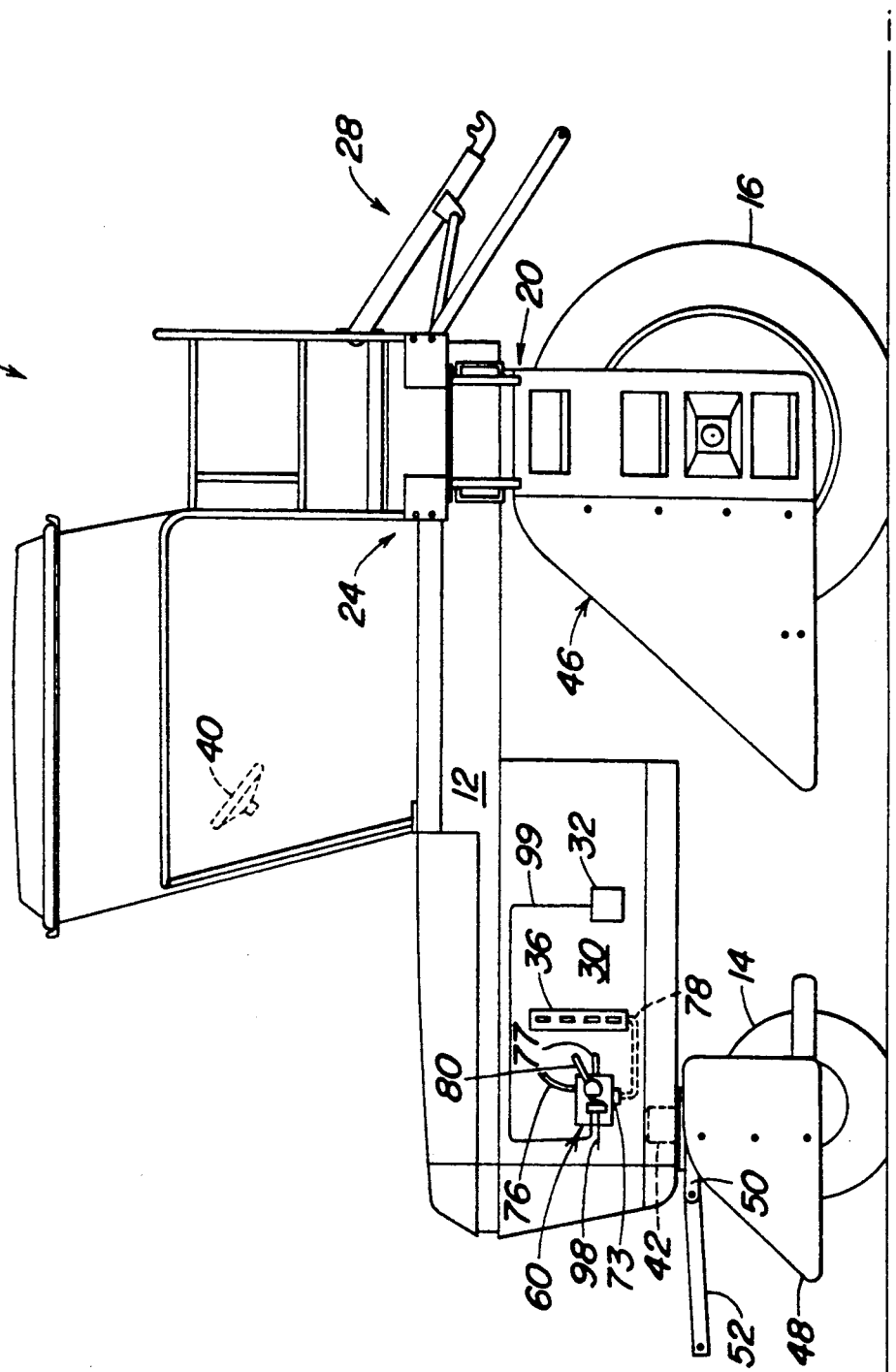
FIG. 1 is a side view of a sprayer with the steering arrangement of the present invention attached thereto.

Referring now to FIG. 1, therein is shown a self-propelled vehicle 10 such as a sprayer having a main frame 12 supported for forward movement over a field with parallel rows of plants by a forward steerable wheel 14 (or wheels 14 of FIG. 2) and a pair of transversely spaced rear drive wheels 16. The drive wheels are carried at the lower ends of a pair of transversely spaced drop axle assemblies 20 having upper ends firmly supported by rail or tube structure 24 extending transversely in both directions from the rear, central portion of the main frame 12. The drop assemblies 20 extend a substantial distance vertically from the wheels 16 to the tube structure 24 to provide good under-axle crop clearance for working in mature crops. A boom support 28 extends rearwardly from the main frame for carrying a conventional transversely extending boom (not shown) with spray nozzles for dispensing chemicals to the soil and/or crop surfaces.

An engine 30 including a fuel injector pump 32 with an electric shut-off valve is supported on the frame 12 for driving the wheels 16. The wheels are driven hydraulically from a source of fluid under pressure on the vehicle. An oil cooler 36 is connected to the source for cooling hydraulic fluid on return to reservoir. A conventional hydraulic steering arrangement including a steering control valve 39 with a steering wheel 40 and a steering mechanism in the form of either a steering motor 42 (FIG. 1) or steering cylinder 44 (FIG. 2) pivots the front wheel 14 (or transversely spaced front wheels 14 of the wide front end version of FIG. 2).

A shield 46 supported adjacent each of the wheels 16 and a shield 48 supported adjacent the steerable wheel 14 prevent the wheels from smashing the crop during spraying. Similar wheel shields (not shown) are provided for the wide front end version of FIG. 2. A towing bracket 50 is connected to the steerable wheel 14. A tow bar 52 is connected to the bracket 50 and to a forward towing vehicle such as a pickup truck (not shown) so that the sprayer 10 may be towed behind the vehicle. The tow bar 52 steers the front wheel 14 during transport. When a wide front end with two wheels is utilized (FIG. 2), the tow bar 52 is connected to the lower end of a central upright shaft 53 for rotation with the shaft about the shaft axis. A steering arm 54 is fixed to the upper end of the shaft for tow bar steering, and the cylinder 44 is also connected to the steering arm for conventional steering during self-propelled operation.

Figure 2:
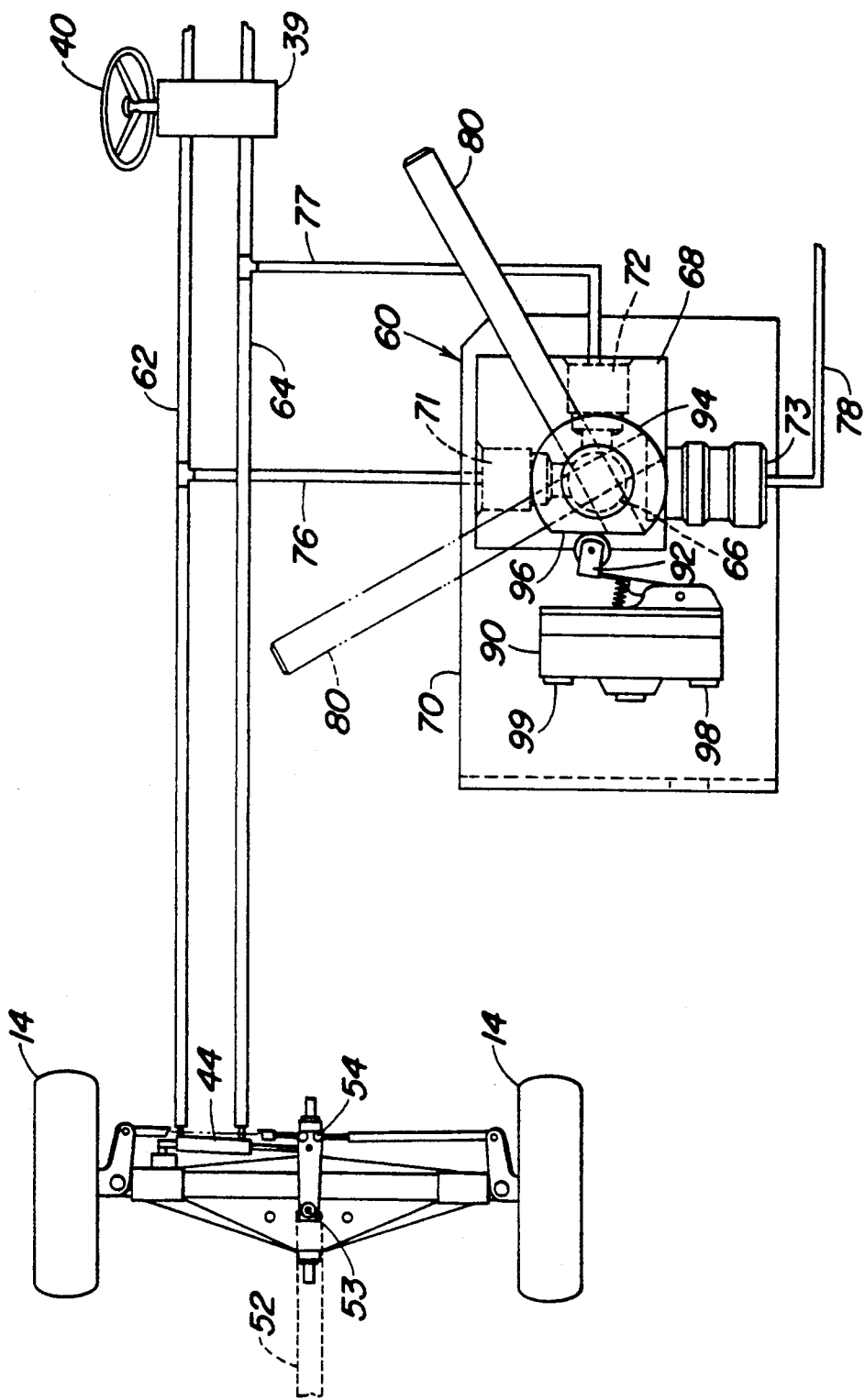
FIG. 2 is a view of the tow valve of the present invention with a schematic of a portion of the hydraulic steering circuit shown.

To enable lateral tow bar movement during connection to the towing vehicle and to provide better trailing of the vehicle 10 during towing, a tow or bypass valve 60 is connected between hydraulic steering lines 62 and 64 from the steering control valve 39 to substantially reduce or eliminate pressure differential between the lines as the front wheel 14 is steered by the tow bar 52. As shown in FIG. 2, the valve 60 is a rotary valve having a spool 66 and a body 68 supported by a bracket 70 on the frame 12. The valve includes first, second and third ports 71, 72 and 73. The first port 71 is connected to the line 62 by a line 76. The second port 72 is connected to the line 64 by a line 77. The third port 73 is capped when a steering motor is used (FIG. 1), but is connected to reservoir through a line 78 (FIG. 2 and the broken lines of FIG. 1) and the oil cooler 36 when a steering cylinder is used to accommodate volume differentials, as will be described in detail below.

An operator handle 80 is connected to one end of the spool 66 to rotate the spool about its axis between a towing position (the position shown by the broken lines of FIG. 2) and a normal operating position (the solid line position of FIG. 2). In the operating position, the ports 71, 72 and 73 are blocked completely so no fluid flow occurs between the ports, and the steering system operates normally. In the towing position, the ports 71, 72 and 73 are open to each other and to the lines 76 and 77 (and line 78 to the cooler 36 if the steering cylinder of FIG. 2 is used) to accommodate front wheel steering by the tow bar 52 without a substantial pressure differential in the lines 62 and 64. If there is a differential fluid flow in the lines 62 and 64 during towing, for example, when a steering cylinder is used, any excess fluid is directed to reservoir through the port 73, line 78 and the cooler 36; any deficiency in fluid is compensated for by an opposite flow from the reservoir through the cooler 36, line 78 and port 73.

A normally closed switch 90 with a depressible actuator 92 is supported from the bracket 70 adjacent the spool 66. A switch activating member 94 is fixed for rotation with the spool 66 in contact with the actuator 92. The outer surface of the member 94 is generally circular with a flat 96 which lies opposite the actuator 92 so that the switch 90 is closed when the handle 80 is in the operate position. As the handle 80 is moved toward the towing position, the member 94 depresses the actuator 92 to open the switch 90 for preventing self-propelled operation of the vehicle 10 when the towing position is selected.

One contact of the switch 90 is connected via lead 98 to the switched power supply on the vehicle 10. The opposite switch contact is connected via lead 99 to the electric shut-off valve of the injection pump 32 so that the injection pump will be operable only when the vehicle ignition switch is on and the handle 80 is in the operate position, that is, when the ports 71 and 72 are closed to provide normal steering operation. When the handle 80 is moved toward the towing position, the switch 90 will open to prevent engine operation while normal steering is disabled. Before the engine can be started after towing, normal steering operation must first be implemented by moving the handle 80 back to the operating position.

For towing of the vehicle 10, the operator turns off the engine, moves the valve handle 80 to the towing position so the steering cylinder or motor may move freely, and attaches the tow bar 52 to the bracket 50 and the towing vehicle. After the vehicle 10 is towed to the desired location, the tow bar 52 is removed and the handle 80 is moved to the operate position to enable normal injection pump and steering operation.

Having described the preferred embodiment, it will become apparent that various modifications can be made without departing from the scope of the invention as defined in the accompanying claims.

I claim:

1. In a self-propelled vehicle having an engine for driving the vehicle and means for towing the vehicle independently of the engine, a steerable wheel and source of hydraulic fluid under pressure including a reservoir, a steering arrangement with hydraulically operated steering mechanism, and first and second hydraulic lines connected between the steering mechanism and the source for selectively turning the steerable wheel when the vehicle is driven by the engine, a bypass arrangement comprising:

a valve having first and second ports connected to the first and second lines, respectively, and movable between a first position wherein fluid flow is prevented between the ports and a second position wherein fluid flow between the ports is facilitated to permit relatively free turning of the steerable wheel during towing; and means responsive to movement of the valve to the second position for preventing self-propelled operation of the vehicle when the relatively free turning of the wheel is provided.

2. The invention as set forth in claim 1 wherein the valve includes a rotational member and the means responsive to movement of the valve includes a switch with an actuator movable in response to rotation of the member.

3. The invention as set forth in claim 1 wherein the valve includes a third port open to the first and second ports when the valve is in the second position, and means connecting the third port to reservoir for facilitating differential fluid flow in the first and second lines without substantial pressure differential in the lines when free turning of the steerable wheel is permitted, wherein the means connecting the third port to reservoir includes an oil cooler connected between the third port and reservoir.

4. In a self-propelled vehicle having an engine for driving the vehicle and means for towing the vehicle independently of the engine, a steerable wheel and source of hydraulic fluid under pressure including a reservoir, a steering valve connected to the source, a hydraulically operated steering motor having first and second hydraulic inputs, and means connecting the inputs to the steering valve for providing a normal fluid flow between the steering valve and the motor for selectively turning the steerable wheel when the vehicle is driven by the engine, a bypass arrangement comprising:

a tow valve having first and second ports connected to the first and second inputs, respectively, and movable between a first position wherein the normal fluid flow is provided between the steering valve and the motor for steering the wheel with the steering valve during self-propelled operation, and a second position wherein fluid flow between the inputs is facilitated to permit free turning of the steerable wheel independently of the steering valve during towing; and switch means for preventing self-propelled operation of the vehicle when the valve is in the second position.

5. The invention as set forth in claim 4 further comprising an oil cooler connected to the reservoir, and wherein the tow valve includes a third port and means connecting the third port to the oil cooler for providing fluid flow through the oil cooler between the inputs and the reservoir when the valve is in the second position.

6. In a self-propelled vehicle having an engine for driving the vehicle and means for towing the vehicle independently of the engine, a steerable wheel and source of hydraulic fluid under pressure including a reservoir, a steering arrangement with hydraulically operation steering mechanism, and first and second hydraulic lines connected between the steering mechanism and the source for selectively turning the steerable wheel when the vehicle is driven by the engine, a bypass and switch arrangement comprising:

a valve having first and second ports connected to the first and second lines, respectively, and movable between a first position wherein fluid flow is prevented between the ports and a second position wherein fluid flow between the ports is facilitated to permit free turning of the steerable wheel during towing;

a switch connected to the engine and having a first state wherein normal engine operation is facilitated and a second state for preventing normal engine operation; and means responsive to movement of the valve to the second position for causing the switch to assume the second state to thereby prevent normal engine operation when free turning of the wheel is provided.

7. The invention as set forth in claim 6 wherein the valve includes a rotational member and the switch includes an actuator movable by the rotational member.

8. The invention as set forth in claim 7 wherein the engine includes an electrically controlled injector pump, and the switch is connected to the pump.

9. In a self-propelled vehicle having an engine for driving the vehicle and means for towing the vehicle independently of the engine, a steerable wheel and source of hydraulic fluid under pressure including a reservoir, a steering arrangement with hydraulically operated steering mechanism connected to the source for selectively turning the steerable wheel when the vehicle is driven by the engine, bypass structure comprising:

valve means connected to the steering arrangement and movable between a first position for facilitating normal steering of the steerable wheel with the steering arrangement while the vehicle is driven, and a second position for free turning of the steerable wheel during towing;

a switch connected to the engine and having a first position wherein normal engine operation is facilitated and a second position for preventing normal engine operation; and means responsive to movement of the valve means to the second position for causing the switch to assume the second position to thereby prevent normal engine operation when free turning of the wheel is provided.

10. The invention as set forth in claim 9 wherein the valve means includes a rotational member and the switch includes an actuator movable by the rotational member.

11. The invention as set forth in claim 9 wherein the engine includes an electrically controlled injector pump, and the switch is connected to the pump.

12. The invention as set forth in claim 9 wherein the steering arrangement includes a hydraulic steering cylinder having first and second inputs, and the valve means includes a bypass valve providing hydraulic fluid flow directly between the cylinder inputs when the valve means is in the second position.

* * * * *